United States Patent
Li et al.

(10) Patent No.: US 8,049,481 B2
(45) Date of Patent: Nov. 1, 2011

(54) ADAPTIVE MULTI-MODE DIGITAL CONTROL IMPROVING LIGHT-LOAD EFFICIENCY IN SWITCHING POWER CONVERTERS

(75) Inventors: Yong Li, Campbell, CA (US); Carrie Seim, Campbell, CA (US); Junjie Zheng, Santa Clara, CA (US); John W. Kesterson, San Jose, CA (US); Liang Yan, Milpitas, CA (US); Clarita Poon, Pleasanton, CA (US); Fuqiang Shi, Cupertino, CA (US)

(73) Assignee: iWatt Inc., Los Gatos, CA (US)

( * ) Notice: Subject to any disclaimer, the term of this patent is extended or adjusted under 35 U.S.C. 154(b) by 240 days.

(21) Appl. No.: 12/608,854

(22) Filed: Oct. 29, 2009

(65) Prior Publication Data

US 2010/0164455 A1   Jul. 1, 2010

Related U.S. Application Data

(60) Provisional application No. 61/141,059, filed on Dec. 29, 2008.

(51) Int. Cl.
*G05F 1/575* (2006.01)
*H02M 3/335* (2006.01)

(52) U.S. Cl. .............. 323/283; 323/284; 363/21.05; 363/21.13

(58) Field of Classification Search ........... 363/21.05, 363/21.13; 323/283, 284, 285
See application file for complete search history.

(56) References Cited

U.S. PATENT DOCUMENTS

| | | | |
|---|---|---|---|
| 5,657,215 A * | 8/1997 | Faulk | 363/41 |
| 7,098,641 B2 | 8/2006 | King | |
| 7,368,897 B2 | 5/2008 | Qahouq et al. | |
| 7,679,938 B2 * | 3/2010 | Ye et al. | 363/21.12 |
| 7,826,237 B2 * | 11/2010 | Zhang et al. | 363/21.12 |

OTHER PUBLICATIONS

PCT International Search Report and Written Opinion, PCT Application No. PCT/US2009/064618, Jan. 13, 2010, 8 pages.

* cited by examiner

*Primary Examiner* — Gary L Laxton
(74) *Attorney, Agent, or Firm* — Fenwick & West LLP

(57) ABSTRACT

Adaptive multi-mode digital control schemes that improve the light-load efficiency (and thus the overall average efficiency) in switch-mode power converters without causing performance issues such as audible noises or excessive voltage ripples. Embodiments include a switch-mode power converter that reduces current in the power converter using a second pulse-width-modulation (PWM) mode before reaching switching frequencies that generate audible noises. As the load across the output of the power converter is reduced, the power converter transitions from a first PWM mode in high load conditions to a first pulse-frequency-modulation (PFM) mode, then to a second PWM mode, and finally to a second PFM mode. During the second PFM mode, the switching frequency is dropped to audible frequency levels. Current in the power converter, however, is reduced in the second PWM mode before transitioning to the second PFM mode. Therefore, the power converter produces less or no audible noise in light load conditions where the switching frequency drops to audible frequency levels, while achieving high efficiency across varying load conditions.

20 Claims, 13 Drawing Sheets

ADAPTIVE MULTI-MODE DIGITAL CONTROL IMPROVING LIGHT-LOAD EFFICIENCY IN SWITCHING POWER CONVERTERS

CROSS-REFERENCE TO RELATED APPLICATION

This application claims priority under 35 U.S.C. §119(e) to co-pending U.S. Provisional Patent Application No. 61/141,059 entitled "Adaptive Multi-Mode Digital Control Improving Light-Load Efficiency in Switching Power Converters," filed on Dec. 29, 2008, which is incorporated by reference herein in its entirety.

BACKGROUND OF THE INVENTION

1. Field of the Invention

The present invention relates to controlling a switching power converter in more than one operation mode to increase the efficiency of the power converter at light load conditions.

2. Description of the Related Arts

Efficiency of a switching power converter is governed largely by two types of loss: switching loss and conduction loss. In most switching power converters, switching loss plays a greater role as the load across the output of the power converter is decreased. Conversely, conduction loss plays a greater role as the load is increased. In order to reduce loss at both high load conditions and light load conditions, some conventional switching power converters use pulse-width-modulation (PWM) and pulse-frequency-modulation (PFM) at different load conditions. PWM mode is generally more efficient than PFM mode at higher load conditions. PFM mode is generally more efficient than PWM mode at lower load conditions.

In PWM mode, a controller of the power converter turns on the switch of the switching power converter at a constant switching frequency but varies the duty cycle of the switch by adjusting how long the switch remains on during each switching period. Conversely, in PFM mode, the switch is turned on for a set duration, but the switching frequency is varied depending on the load. Specifically, in PFM mode, the switching frequency is increased as the load increases, and switching frequency is decreased as the load decreases.

Some conventional power converters operate in both PFM mode and PWM mode depending on the load conditions to achieve high efficiency at varying load conditions. Figure (FIG.) 1 is a graph illustrating the operation of such conventional power converter in constant voltage (CV) mode represented by line J-K. Line K-L represents operation of the power converter in constant current (CC) mode. In CV mode, the output voltage Vout remains constant. Therefore, the load is proportional to the output current Iout. As illustrated in FIG. 1, the power converter operates in PWM mode during high load conditions between $I_3$ and $I_4$. In light load conditions (output current below a threshold output current $I_3$), the power converter operates in PFM mode. The threshold level $I_3$ is generally set below 10% of the maximum current (or load) that can be handled by the power converter.

Such low setting of threshold level $I_3$, however, does not help improve the efficiency at 25% load. Therefore, conventional PWM/PFM control with low threshold level $I_3$ does not help improve the overall average efficiency, for example, as defined by world wide energy standards such as US-EPA 2.0 and EU-CoC. Such standards specify the average efficiency of the power converter based on averaging of the efficiencies at four loading points: 25% load, 50% load, 75% load, and 100% load. Therefore, it is desirable to transition to PFM mode at a higher loading condition (e.g., 50% of the maximum current) to take advantage of power saving feature of PFM mode.

With conventional control approaches, however, PWM mode to PFM mode transition at higher load conditions suffer from serious performance problems such as excessive voltage ripples caused by unsmooth transition between PWM mode and PFM mode.

Other conventional power converters operate in PFM mode throughout the entire range of load conditions. The power converters operating only in PFM mode suffer from audible noises when the switching frequency drops to around 16 kHz. With the wide dynamic range of possible loads, it is difficult to stay out of the audio band using this technique.

Some conventional power converters operate in PWM mode throughout the entire range of load conditions. Such conventional power converters operate at a switching frequency above the audible range, and therefore, do not generate audible noises. The power converters operating only in PWM mode, however, suffer from low efficiency in light load conditions.

In addition to the active-mode efficiencies where a power converter provides an output power that is a fraction of the maximum output intended for the power converter, power consumption associated with no-load conditions is another regulation target of the world wide energy standards. A no-load condition refers to a power convert operation condition during which the input of the power converter is connected to a power source, but the output is not connected to any load. At the no-load conditions, although its output power and load is zero, the power converter still consumes certain input power mostly due to the switching and conduction losses caused by the switch, the power consumed by the controller itself, and the power consumed by resistors and capacitors inside of the power converter.

SUMMARY OF THE INVENTION

Embodiments include adaptive multi-mode digital control approaches that improve the switching power converter light-load efficiency without causing performance issues such as large audible noises or excessive voltage ripple or degraded dynamic load response. The switching power converter includes a switch that electrically couples or decouples a load to or from a power source. A switch controller coupled to the switch controls on-times and off-times of the switch. The switch controller includes digital logic for generating a pulse signal that controls on-times and off-times of the switch. The digital logic modulates the width of the pulse signal and maintains a frequency of the pulse signal at a first frequency when the load exceeds a first load level. The digital logic also modulates the frequency of the pulse signal and maintains the width of the pulse signal constant when the load drops below the first load level but exceeds a second load level. The digital logic modulates the width of the pulse signal and maintains the frequency of the pulse signal at a second frequency (lower than the first frequency) when the load drops below the second load level but exceeds a third load level.

In one embodiment, the second frequency is higher than an audible frequency range. Current in the power converter is reduced by modulating the width of the pulse signal in PWM mode at the second frequency before modulating the frequency of the pulse signal in PFM mode. Hence, the current in the power converter is significantly reduced before reaching the audible frequency range by frequency modulation. In this way, audible noise produced by the power converter is significantly reduced when the power converter operates in light load conditions.

In one embodiment, the frequency of the pulse signal is modulated in PFM mode and the width of the pulse signal is maintained constant when the load exceeds a fourth load level but does not exceed the third load level. The width of the pulse signal is modulated and the frequency of the pulse signal is maintained at a third frequency in PWM mode when the load exceeds a fifth load level but does not exceed the fourth load level. The third frequency may be determined to maintain the undershoot of output voltage of the power converter within a permissible range responsive to initial connection of the load to the power converter from a no-load or very-light-load condition. In this way, the power converter can exhibit improved dynamic performance when the load is initially connected to the power converter from a no-load conditions or a very-light-load condition.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

Figure 1:
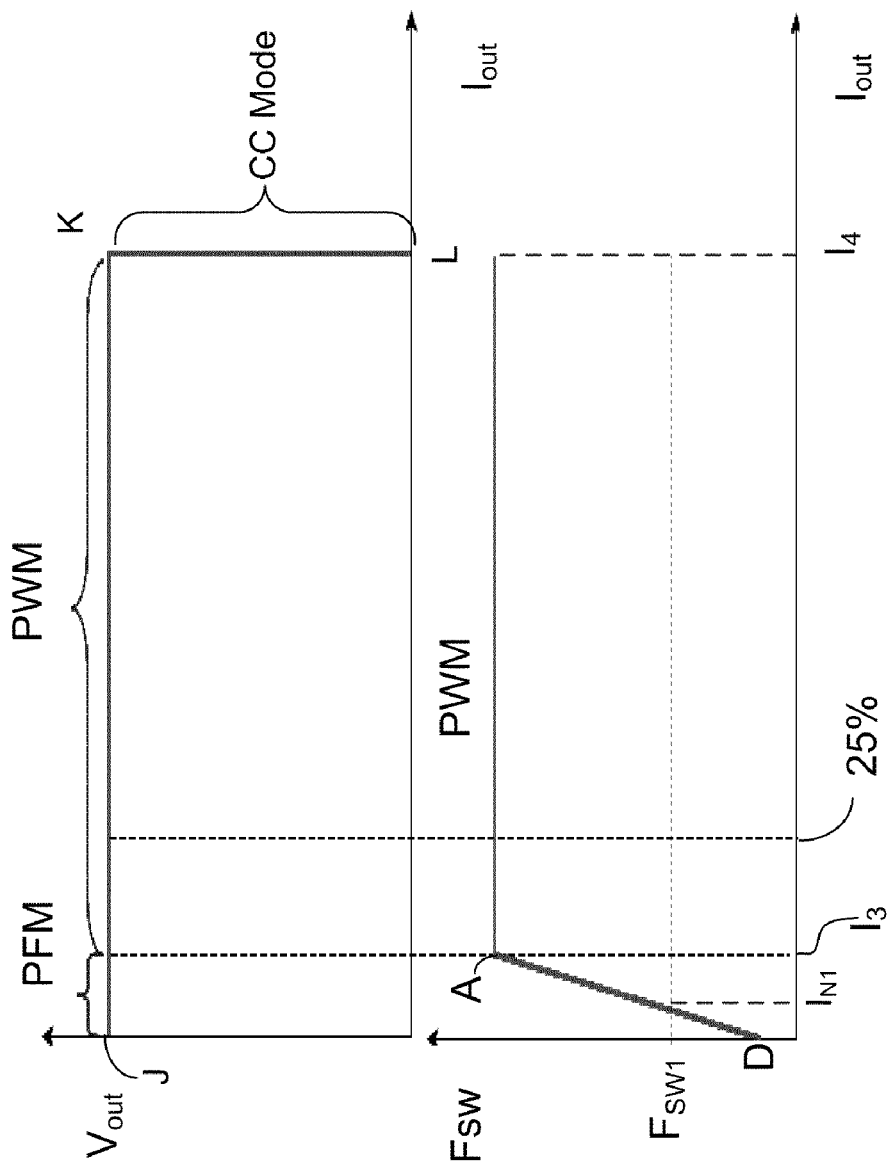
FIG. 1 is a graph illustrating modes of operation in a conventional switching power converter.

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Embodiments include a switch-mode power converter that reduces current in the power converter using PWM mode before reaching switching frequencies that generate audible noise in the power converter. As the load across the output of the power converter is reduced, the power converter transitions from first pulse-width-modulation (PWM) mode in high load conditions to first pulse-frequency-modulation (PFM) mode, then to second PWM mode, and to second PFM mode. During second PFM mode, the switching frequency is dropped to audible frequencies. Current in the power converter, however, is reduced to a negligible level in second PWM mode before transitioning to second PFM mode. Therefore, the power converter produces less or no audible noise in light load conditions when the switching frequency drops to audible frequency levels in second PFM mode, while achieving high efficiency across varying load conditions. Further, the power converter may transition to third PWM mode and operate in third PWM mode in light-load or no-load conditions to enhance dynamic response of the power converter in the light-load or no-load conditions. If in any cases the load drops further or during load transients, the power converter may transition to third PFM mode to prevent the output voltage from increasing to an abnormally high level.

In PWM mode, a power switch of the power converter is turned ON or OFF with a constant switching frequency (and therefore has a constant switching period). The duty cycle of the switch is varied by adjusting how long the switch remains ON during each switching period. The duty cycle refers to the fraction (often expressed as a percentage) of the switching period during which the switch is turned ON. For example, in a PWM mode, the switch may be turned ON at a switching frequency of 100 kHz (and therefore has a switching period of 10 µs). For a duty cycle of 30%, the switch is ON for 3 µs and OFF for 7 µs of each switching period.

In PFM mode, the power switch of the power converter is turned ON for a set duration, but operates with a variable switching frequency (and therefore has a variable switching period). For example, in PFM mode, a switch may be turned on for 5 μs of each switching period, but the switching frequency may be varied between 40 kHz and 130 kHz. A switching frequency of 40 kHz corresponds to a switching period of 25 μs, and therefore, the duty cycle at this switching frequency is 20% (=5 μs/25 μs). For a switching frequency of 130 kHz, the switching period is 7.7 μs, and therefore, the duty cycle at 130 kHz is 65% (=5 μs/7.7 μs).

A no-load condition refers to a power convert operation condition during which the input of the power converter is connected to a power source but the output of the power converter is not connected to any load. At the no-load conditions, although its output power and load is zero, the power converter still consumes certain input power mostly due to the switching and conduction losses caused by the switch, the power consumed by the controller itself as well as the power consumed by resistors and capacitors inside of the power converter.

Example Power Converter Circuit

Figure (FIG.) 2 is a circuit diagram illustrating a switching power converter 100, according to one embodiment. The power converter 100 includes three principal sections, i.e., a front end 104, power stage, and a secondary stage. The front end 104 is connected to an AC voltage source (not shown) at nodes L, N, and includes a bridge rectifier comprised of inductor L1, resistors R1, F1, diodes D1, D2, D3, D4, and capacitor C2. The rectified input line voltage at node 105 is input to the supply voltage pin Vcc (pin 1) of controller IC 102 via resistors R10 and R11. The line voltage at node 105 is also connected to the primary winding 106 of power transformer T1-A. Capacitor C5 removes high frequency noise from the rectified line voltage. The output of the front end section at node 105 is an unregulated DC input voltage.

The power stage is comprised of power transformer T1-A, BJT power switch Q1, and controller IC 102. Power transformer T1-A includes a primary winding 106, a secondary winding 107, and an auxiliary winding 108. Controller 102 maintains output regulation via control of the ON and OFF states of BJT power switch Q1. The ON and OFF states of BJT power switch Q1 are controlled via a control signal 110 output from the OUTPUT pin (pin 5) of controller IC 102. Control signal 110 drives the base (B) of BJT power switch Q1. The collector (C) of BJT power switch Q1 is connected to the primary winding 106, while the emitter (E) of BJT power switch Q1 is connected to the $I_{SENSE}$ pin (pin 4) of controller IC 102 and to ground via resistor R12. $I_{SENSE}$ pin senses the current through the primary winding 106 and BJT switch Q1 in the form of a voltage across sense resistor R12. Controller IC 102 employs the modulation technique as described below in detail with reference to FIG. 3A or FIGS. 5A and 5B to control the ON and OFF states of power switch Q1, the duty cycles of BJT power switch 110 and the amplitude of the BJT base current. The GND pin (pin 2) of controller IC 102 is connected to ground.

The secondary stage is comprised of diode D6 functioning as an output rectifier and capacitor C10 functioning as an output filter. The resulting regulated output voltage Vout at node 109 is delivered to the load (not shown) and a pre-load R14. The pre-load R14 stabilizes the output of the power converter at no load conditions. Also, ESD (Electrostatic Discharge) gap (ESD1) is coupled between the primary winding 106 and diode D6.

The output voltage Vout at node 109 is reflected across auxiliary winding 108, which is input to the $V_{SENSE}$ pin (pin 3) of controller IC 102 via a resistive voltage divider comprised of resistors R3 and R4. Also, although controller IC 102 is powered up by the line voltage 105 at start-up, controller IC 102 is powered up by the voltage across auxiliary winding 108 after start-up and in normal operation. Thus, diode D5 and resistor R2 form a rectifier for rectifying the voltage across auxiliary winding 108 for use as the supply voltage input to the $V_{CC}$ pin (pin 1) of controller IC 102 after start-up during normal operation. Capacitor C9 is used to hold power from the line voltage at node 105 at start-up or from the voltage across auxiliary winding 108 after start-up between switching cycles.

Figure 2A:
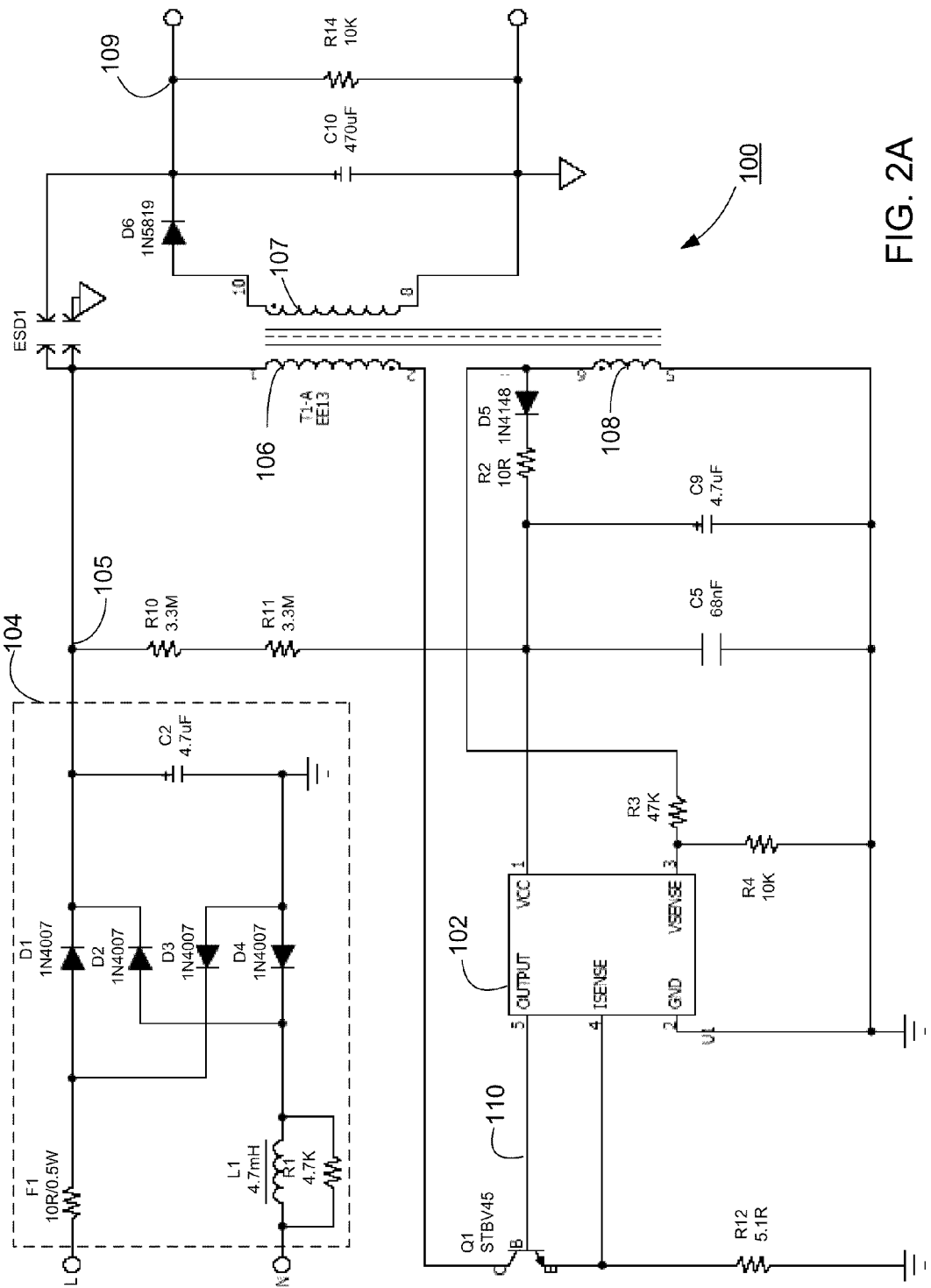
FIG. 2A is a circuit diagram illustrating a switching power converter, according to one embodiment.
Figure 2B:
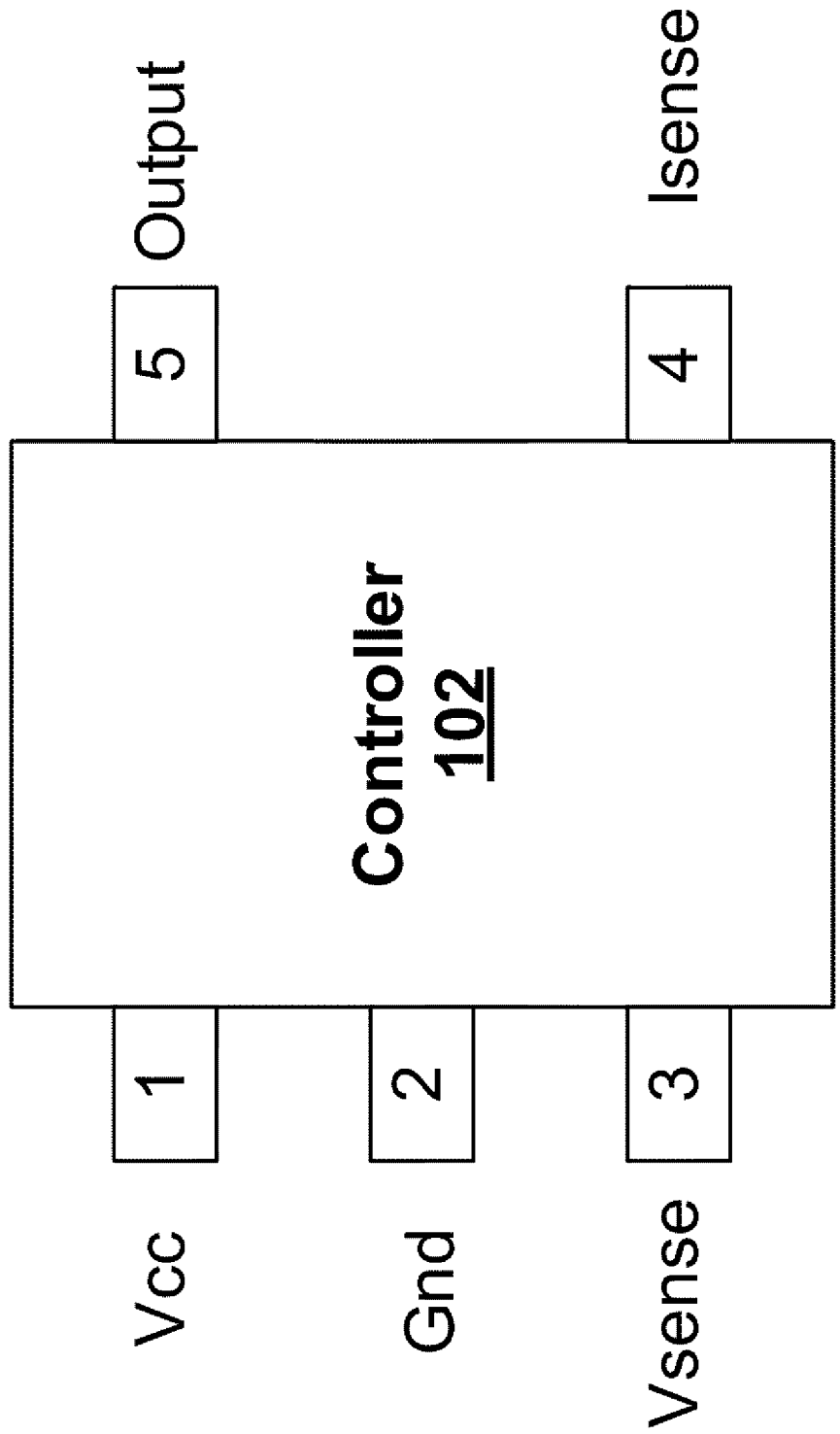
FIG. 2B is a diagram illustrating the pin-outs of the controller of the switching power converter, according to one embodiment.

FIG. 2B is a diagram illustrating the pin-outs of the controller IC of the switching power converter 100, according to one embodiment. Controller IC 102 is a 5-pin IC. Pin 1 (Vcc) is a power input pin for receiving the supply voltage, pin 2 (Gnd) is a ground pin, pin 3 ($V_{SENSE}$) is an analog input pin configured to receive the voltage across the auxiliary winding 108 of the flyback switching power converter for primary-side regulation of the output voltage Vout, pin 4 ($I_{SENSE}$) an analog input pin configured to sense the primary-side current of the flyback switching power converter in the form of an analog voltage, for cycle-by-cycle peak current control and limit. Pin 5 (Output) is an output pin outputting base drive signal 110 for controlling the on-times and off-times of the BJT power switch Q1 as well as the amplitude of the BJT base current.

Figure 2C:
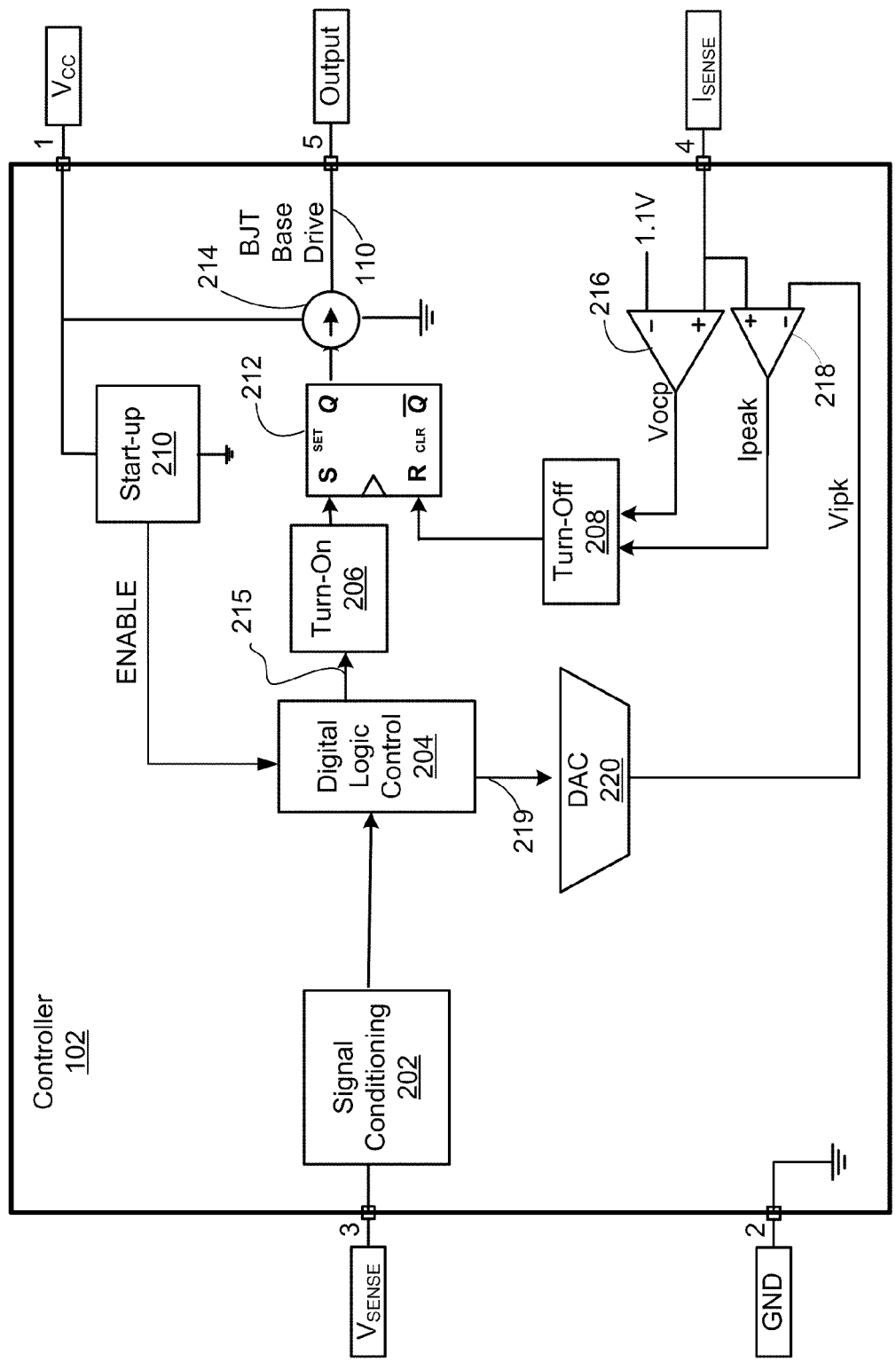
FIG. 2C is a block diagram illustrating the internal circuitry of the controller of the switching power converter in more detail, according to one embodiment.

FIG. 2C is a block diagram illustrating the internal circuitry of the controller IC 102 of the switching power converter in more detail, according to one embodiment. Controller IC 102 receives analog parameters such as the $V_{SENSE}$ voltage at pin 3 and the $I_{SENSE}$ voltage at pin 4, but adaptively processes these parameters using digital circuitry and digital state machines to generate the appropriate base drive signal at pin 5 (Output). Controller IC 102 includes several main circuit blocks, including start-up block 210, signal conditioning block 202, digital logic control 204, digital-to-analog converter (DAC) 220, turn-on logic block 206, turn-off logic block 208, SR flip flop 212, Ipeak comparator 218, over-current protection (OCP) comparator 216, and BJT base driver 214. Controller IC 102 regulates the output voltage Vout and output current Iout of the switching power supply 100 by means of adaptive digital, primary-side feedback control. Sensing the primary-side current at the $I_{SENSE}$ pin (pin 4) allows cycle-by-cycle peak current control and limit in both CV (Constant Voltage) and CC (Constant Current) modes as well as precise constant current (output current Iout) control that is insensitive to the magnetizing inductance Lm of the transformer T1-A. Sensing the output voltage Vout reflected across the auxiliary winding 108 at the $V_{SENSE}$ pin (pin 3) allows for precise output voltage regulation.

Controller IC 102 causes switching power supply 100 to operate in a PWM/PFM mode depending on load conditions, as described below in detail with reference to FIGS. 3A, 5A and 5B. More specifically, after power up, when the supply voltage $V_{CC}$ voltage is built up to a voltage higher than a predetermined power-on-reset (POR) threshold, an ENABLE signal is generated from start-up block 210. ENABLE signal is sent to digital logic control block 204 that initiates a turn on command. In response, the turn-on logic block sets SR flip flop 212, causing BJT base drive current generator 214 to generate a base drive current 110 via the OUTPUT pin (pin 5) to turn on the BJT power switch Q1. Controller IC 102 then receives feedback information on the output voltage Vout as reflected on auxiliary winding 108 via the $V_{SENSE}$ pin (pin 3).

Signal conditioning block 202 receives the $V_{SENSE}$ voltage and generates a variety of voltage and current feedback parameters for use by digital logic control block 204. Signal conditioning block 202 generates a variety of voltage feedback information, such as a digital feedback voltage value $V_{FB}$. $V_{FB}$ is a digital value representative of the $V_{SENSE}$ voltage sampled at the end of the transformer reset time in each switching cycle, scaled to a comparable level for comparison with the reference voltage $V_{REF}$. $V_{REF}$ is also a digital value representative of the target regulated output voltage (e.g., 5V) of the switching power converter, scaled to a lower value (e.g., 1.538 V) according to the turns ratio between the secondary winding 107 and the auxiliary winding 108 and the resistive voltage divider (R3/(R3+R4)). Thus, the specific value of the reference voltage $V_{REF}$ is determined according to the target regulated output voltage of the switching power converter. As to current feedback, signal conditioning block 202 provides secondary current timing information such as Tp (switching period) and Trst (transformer reset time) to digital logic control block 204. The voltage feedback values and current feedback values, including $V_{FB}$, Tp, and Trst may be determined using one of a variety of conventional techniques.

A control voltage Vc, the Tp information and the Trst information are used to calculate an appropriate digital value 219 of Vipk to be used as the peak threshold value for peak current mode switching. The control voltage Vc represents the level of load at the node 109. The control voltage Vc increases as the load at the node 109 increases while Vc decreases as the load at the node 109 decreases. In peak current mode switching in PWM or DPWM or DDPWM mode, if output voltage Vout is lower than desired, Vc is increased which in turn increases the ON time of the switch. By increasing the ON time of the switch, more energy is transferred per cycle, which in turn increases Vout. Conversely, if the output voltage Vout is higher than desired, then Vc is decreased. Decrease in Vc causes the ON time of the switch to be decreased. Decreasing the ON time causes less energy to be transferred per cycle, which in turn decreases Vout. Likewise, in peak current mode switching in PFM or DPFM or DDPFM mode, if output voltage Vout is lower than desired, Vc is increased which in turn decreases the OFF time of the switch per switching cycle. By decreasing the OFF time of the switch per cycle, more energy is transferred during the same amount of time, which in turn increases Vout. Conversely, if the output voltage Vout is higher than desired, then Vc is decreased. Decrease in Vc causes the OFF time of the switch to be increased per cycle. Increasing the OFF time per cycle causes less energy to be transferred during the same amount of time, which in turn decreases Vout.

For safety and reliability, controller IC 102 also includes over-current protection (OCP) comparator 216. Once the $I_{SENSE}$ pin voltage reaches an OCP threshold (e.g., 1.1 V in the example of FIG. 2C), the output Vocp of comparator 216 is set to high, causing turn-off block 208 to reset SR flip flop 212. In response, BJT base driver 214 turns off BJT power switch Q1. Thus, no matter what operation conditions or operation mode the switching power supply 100 is in, the BJT base driver 214 is turned off immediately for safety reasons. Other safety measures may also be provided in controller 102, such as a mechanism to protect the power supply if resistor R12 is shorted or to turn off the BJT base driver 214 when a fault occurs, which is not shown herein.

Adaptive Mode Transition

Figure 3A:
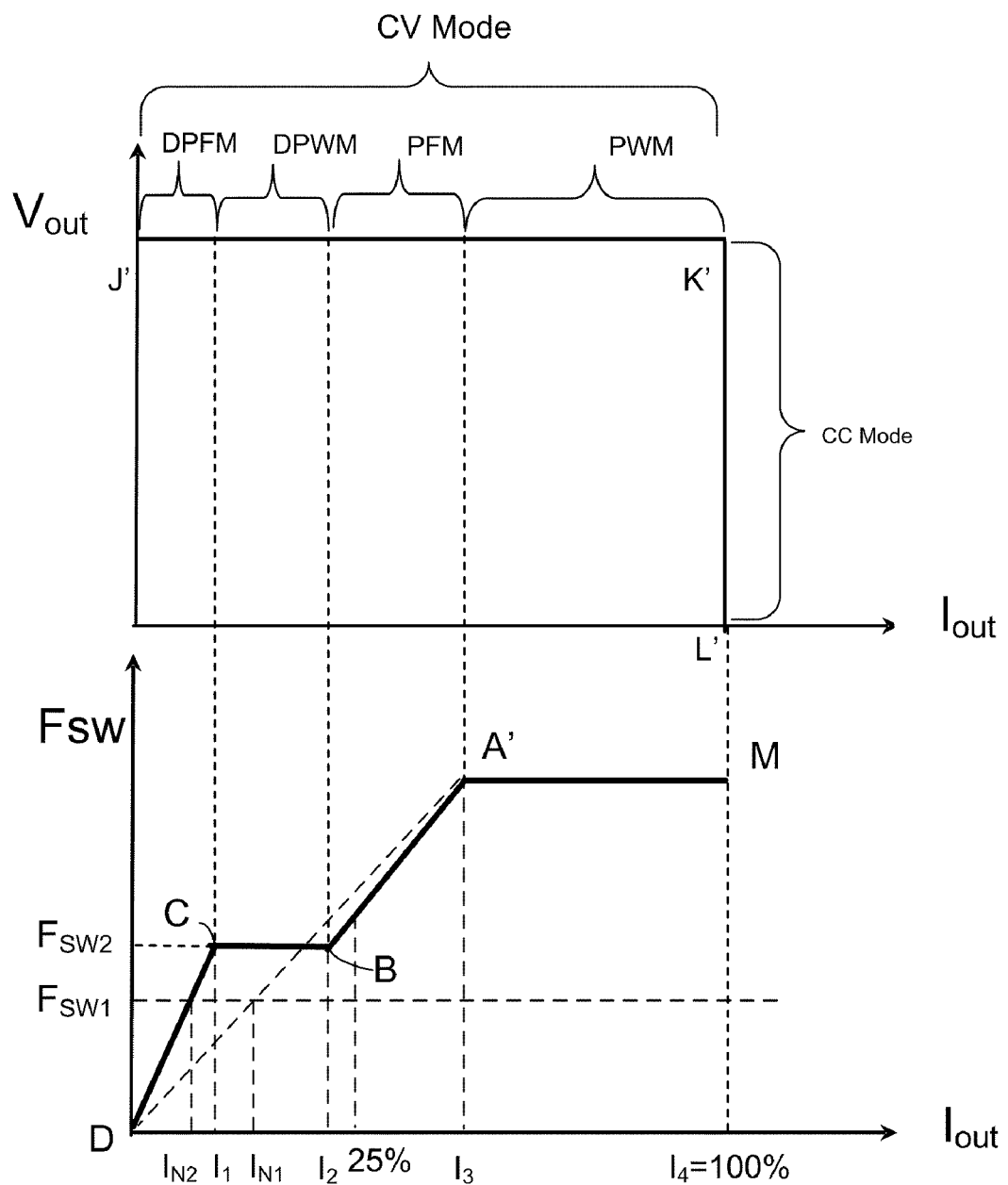
FIG. 3A is a graph illustrating the operation modes of a switching power converter, according to one embodiment.

FIG. 3A illustrates a graph illustrating the operation of the switching power converter, according to one embodiment. Line J'-K' represents the operation of the power converter in constant voltage (CV) mode. Line K'-L' represents the operation of the power converter in constant current (CC) mode. Assume that the point for transitioning from PWM mode to PFM mode is moved to A' to increase efficiency and that the power converter operates in a single PFM mode throughout the light loading conditions below output current level of $I_3$, as illustrated by a dashed line A'-D in FIG. 3A. Although the efficiency of the power converter may be increased because the power converter operates in PFM mode around the 25% load range, the moving of the transition point A' higher up in the load level results in another issue. That is, as the switching frequency approaches the audible frequency around 16 KHz ($F_{SW1}$), the power converter starts to generate audible noise. The audible noise is generated mainly by electro-mechanical vibration in the transformer of the power converter. The output current $I_{N1}$ of the power converter remains relatively high when the audible frequency $F_{SW1}$ is reached, and therefore, the power converter generates considerable audible noise when the switching frequency drops to audible frequency $F_{SW1}$.

In one embodiment, the power converter operates in modes as indicated by lines M-A', A'-B, B-C and C-D. In high load conditions represented as a straight line M-A', the power converter operates in first PWM mode to generate an output current Iout in the range above $I_3$ up to the maximum output current $I_4$. If the output current Iout drops below $I_3$, the power converter transitions from first PWM mode (represented by line M-A') to first PFM mode (represented by line A'-B) followed by second PWM mode (hereinafter referred to as 'deep' PWM or DPWM, represented by line B-C) which is again followed by second PFM mode (hereinafter referred to as 'deep' PFM or DPFM, represented by line C-D). Contrast this with conventional power converters where a single PFM mode represented by line A'-D is used throughout the output current level below $I_3$.

As the output current Iout of the power converter drops to $I_3$, the power converter switches to PFM mode represented by line A'-B. As described above, world wide energy standards specify the average efficiency of the power converter based on the averaging of the efficiencies at four loading points (25% load, 50% load, 75% load, and 100% load). In order to satisfy such standards, it is advantageous to set $I_3$ at a level substantially higher than 25% of the maximum load so that the power converter operates in PFM mode around the 25% load level. In one embodiment, $I_3$ is set around 50% of the maximum output current $I_4$.

If the output current of the power converter drops further to $I_2$, the power converter transitions to DPWM mode where the duty cycle of the switch is controlled by adjusting the duration of ON times of the switch in each switching cycle, as in any PWM mode. During DPWM mode, the switching frequency is maintained at $F_{SW2}$ which is higher than the audible frequency range. In one embodiment, the $F_{SW2}$ is around 20 kHz, which is higher than the audible frequency range. The power converter operates in DPWM mode as represented by line B-C where the power converter generates an output current Iout between $I_1$ and $I_2$. In one embodiment, $I_1$ and $I_2$ are set around 5% and 20% of the maximum output current $I_4$, respectively.

Maintaining DPWM mode as the load becomes even lighter is undesirable for at least the following reasons: (i) the fixed switching frequency at $F_{SW2}$ results in higher switching loss, (ii) a low power consumption at the no-load conditions cannot be achieved, and (iii) the minimum switching ON time limit forces the power converter to generate an output voltage higher than desired. Therefore, as the output current of the power converter drops further to $I_1$, the power converter transitions to DPFM mode where the switching frequency is controlled, as in any PFM mode. The operation region of DPFM mode is indicated by line C-D in FIG. 3A. While operating in DPFM mode, the switching frequency of the power converter drops to $F_{SW1}$ in the audible frequency range. However, the output current of the power converter at the switching frequency $F_{SW1}$ in DPFM mode is $I_{N2}$ which is substantially lower than $I_{N1}$ in PFM mode of FIG. 1. Thus, the power converter operating according to the transition scheme of FIG. 3A produces less or no audible noise compared to the conventional power converter operating in a single PFM mode (as represented by line A'-D).

Adding intervening DPWM mode between PFM mode and DPFM mode is advantageous for the additional reason that DPWM mode provides smooth transition between PFM mode and DPFM mode. By operating in DPWM mode, abrupt jumps in the switching ON times and primary peak currents in the power converter are reduced or removed. Therefore, excessive voltage ripples or unstable regulation of output power is avoided. Further, by adding the intervening DPWM mode, the switching frequency may be kept above audible frequencies until the energy transfer per cycle is low enough to not cause the audible noise.

Example of Digital Logic Control Block

Figure 3B:
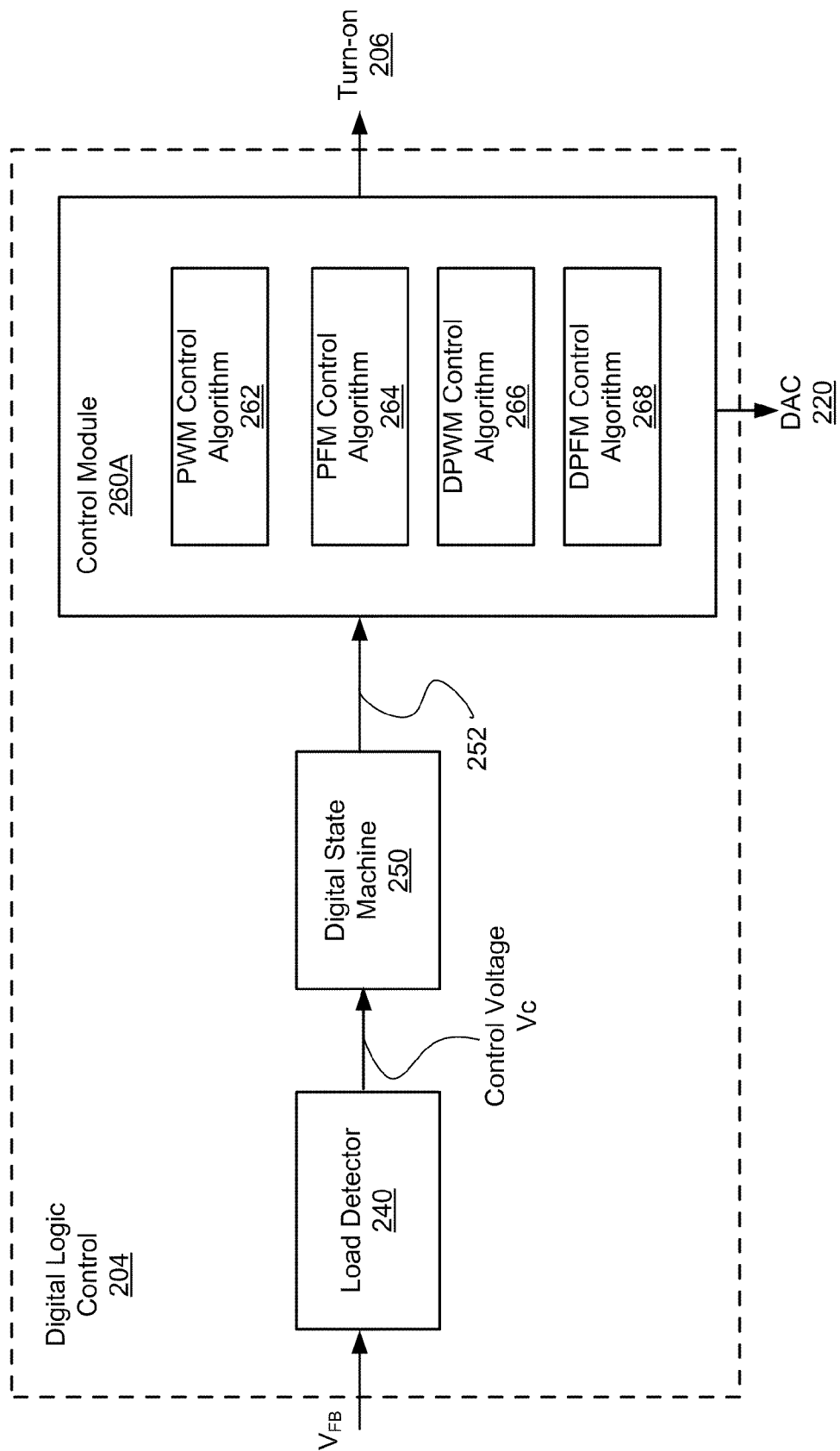
FIG. 3B is a block diagram illustrating an example circuitry of digital logic control block of the controller in the switching power converter implementing the operation modes of FIG. 3A, according to one embodiment.

FIG. 3B is a block diagram illustrating an example of circuitry of digital logic control block 204 of the controller IC of the switching power converter, according to one embodiment. The digital logic control 204 includes, among other components, a load detector 240, a digital state machine 250 and a control module 260A. The load detector 240 receives the voltage and current feedback parameters provided by signal conditioning block 202 to generate a control voltage Vc. The control voltage Vc is correlated with the level of load at the node 109 of the power converter 100. Specifically, higher Vc indicates a higher level of load, whereas lower Vc indicates a lower level of load. The digital state machine 250 selects one of the four modes (PWM mode, PFM mode, DPWM mode and DPFM mode), described with reference to FIG. 3A based on the control voltage Vc. The digital state machine 250 outputs a selection signal 252 indicating the selected mode of operation of the power converter 100. The control module 260A receives the selection signal 252 and activates one of the following four control algorithms: a PWM control algorithm 262 implementing PWM mode, a PFM control algorithm 264 implementing PFM mode, a DPWM control algorithm 266 implementing DPWM mode, and a DPFM control algorithm 268 implementing DPFM mode. The activated algorithm generates the digital input signal 219 for the DAC 220 and a turn-on signal 215 for the turn-on logic block 206.

Figure 3C:
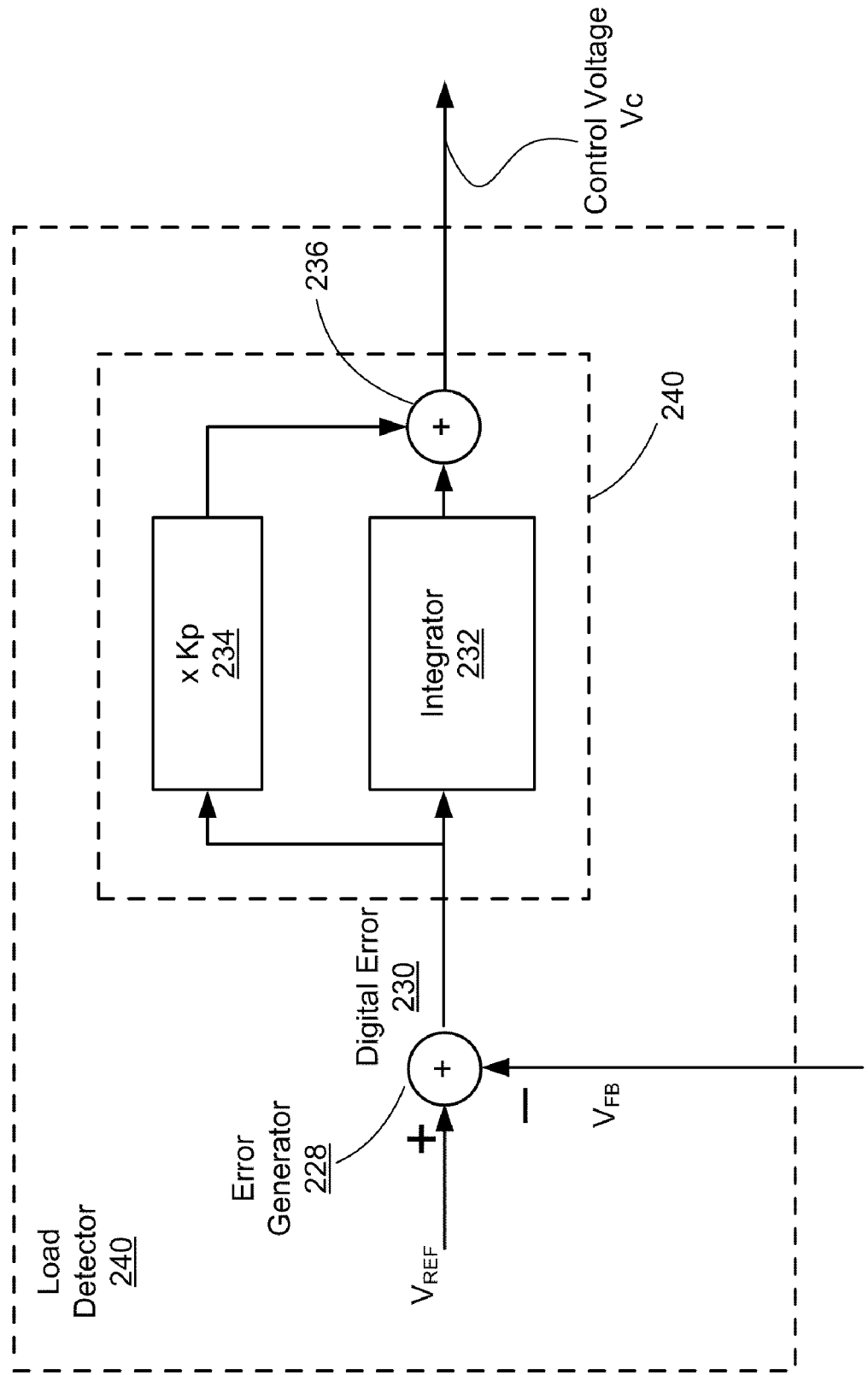
FIG. 3C is a block diagram illustrating a load detector of the digital logic control block of the controller implementing the operation modes of FIG. 3A, according to one embodiment.

FIG. 3C is a block diagram illustrating a load detector 240 of the digital logic control block of the controller IC 120 of the switching power converter, according to one embodiment. The load detector 240 includes, among other components, a digital error generator 228 that determines the difference between digital voltage feedback value $V_{FB}$ and the digital reference voltage value $V_{REF}$. The resulting digital error signal 230 is input to a P-I function (proportional-integral function) 240 comprised of an integrator 232 and a proportional block 234. Integrator 232 integrates digital error signal 230 over time, the output of which is added to a scaled value (scaled by coefficient Kp in proportional block 234) of the digital error signal 230 in adder 236 to generate control voltage Vc 236. Control voltage Vc 236 indicates the extent of power supply loading, i.e., how much energy has to be transferred to the load per switching cycle in order to maintain the required output voltage, so that the digital error signal 230 is maintained zero. In general, a high control voltage Vc indicates that the output current is lower than desired and should be increased. The detailed shape of the transfer function that defines the control voltage Vc 236 as a function of load current is defined by the algorithms 262, 264, 266, and 268 in the control module 260A. Specifically, the algorithms 262, 264, 266 and 268 define the cycle on time and switching frequencies for each mode of operation. Although FIG. 3C illustrates a digital implementation of generating the control voltage Vc, other analog implementations can be used to generate a similar parameter reflecting the extent of power supply loading.

Figure 3D:
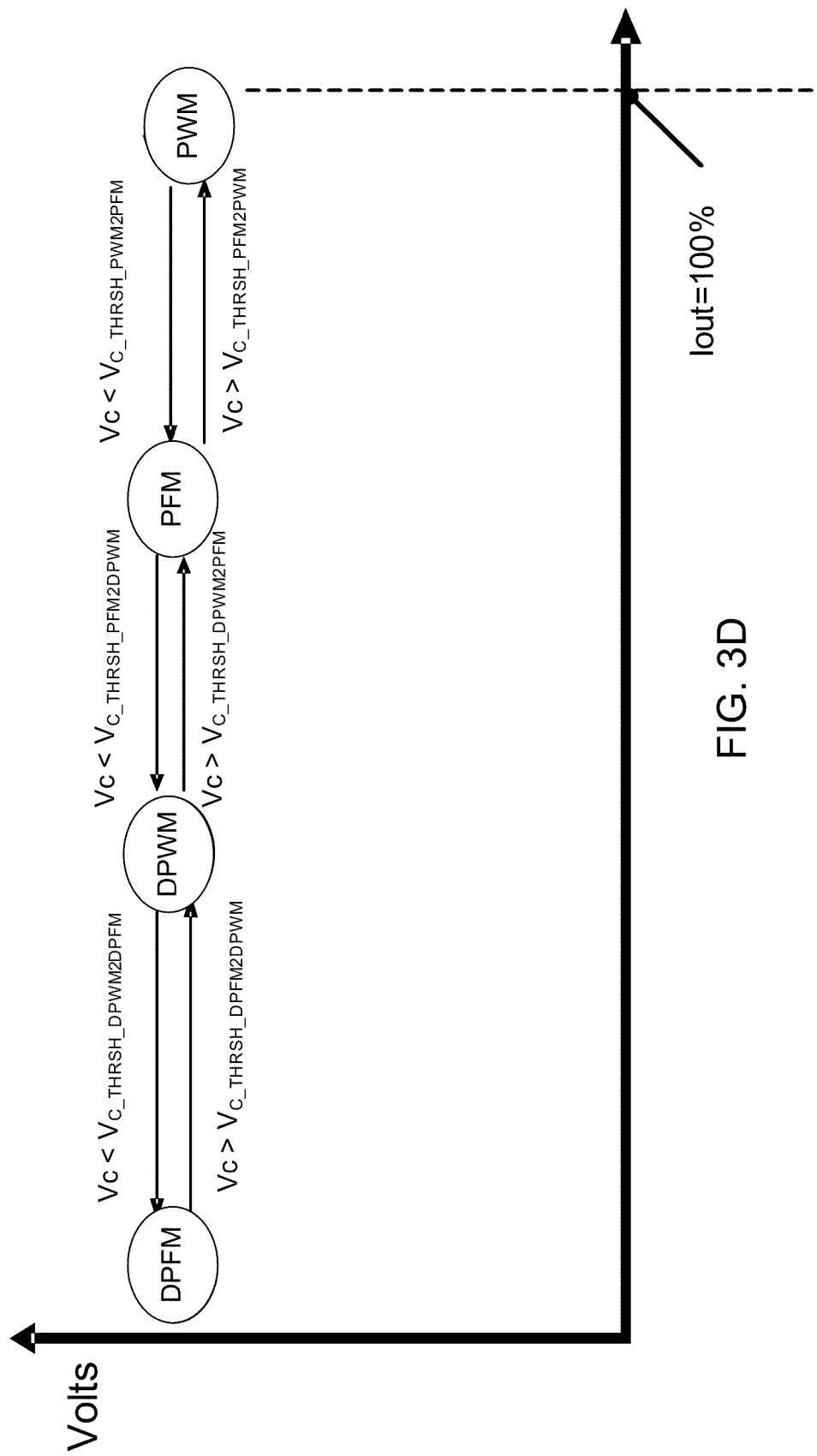
FIG. 3D is a state transition diagram illustrating operating modes of the switching power converter implementing the operation modes of FIG. 3A, according to one embodiment.

FIG. 3D is a state transition diagram illustrating the operating modes of the switching power converter, according to one embodiment. The transition of operation modes take place in the power converter based on the control voltage Vc that serves as an indicator for the load across the output of the power converter. When the control voltage Vc drops to a set value $V_{C\_THRSH\_PWM2PFM}$, the operation mode of the power converter transitions from PWM mode to PFM mode. As the control voltage Vc drops further to a set value $V_{C\_THRSH\_PFM2DPWM}$, the power converter transitions from PFM mode to DPWM mode. As the control voltage Vc drops below a set value $V_{C\_THRSH\_DPWM2DPFM}$, the power converter transitions from DPWM mode to DPFM mode.

On the other hand, if the control voltage Vc rises above a set value $V_{C\_THRSH\_DPFM2DPWM}$, the operation mode of the power converter transitions from DPFM to DPWM mode. When the control voltage Vc rises further above a set value $V_{C\_THRSH\_DPWM2PFM}$, the power converter transitions from DPWM mode to PFM mode. As the control voltage Vc rises above a set value $V_{C\_THRSH\_PFM2PWM}$, the power converter transitions from PFM mode to PWM mode. In one embodiment, $V_{C\_THRSH\_DPWM2DPFM}$ and $V_{C\_THRSH\_DPFM2DPWM}$ are set to the values that are generated by the load detector 240 when the output current is at level $I_1$ with certain hysteresis. Likewise, $V_{C\_THRSH\_PFM2DPWM}$ and $V_{C\_THRSH\_DPWM2PFM}$ are set to the values that are generated by the load detector 240 when the output current is at level $I_2$, with certain hysteresis. $V_{C\_THRSH\_PWM2PFM}$ and $V_{C\_THRSH\_PFM2PWM}$ may also be set to the values that are generated by the load detector 240 when the output current is at level $I_3$ with certain hysteresis.

Referring back to FIG. 3A, the controller IC 102 may operate in either a constant voltage (CV) mode or constant current (CC) mode for output regulation. Using Vc, Tp and Trst information, one of the four control algorithms 262 through 268 is selected to generate the appropriate turn-on signal 206 to turn on power switch Q1 as well as the appropriate digital input signal 219. Digital input signal 219 is converted to an analog peak current mode threshold voltage Vipk for peak current mode switching. Vipk is input to comparator 218 and compared with the $I_{SENSE}$ voltage indicative of the primary side current through BJT power switch Q1 in switching power converter 100. Once the $I_{SENSE}$ pin voltage reaches the peak current mode threshold voltage Vipk, the output Ipeak of comparator 218 is set to high, causing turn-off block 208 to reset SR flip flop 212. In response, BJT base driver circuit 214 turn off BJT power switch Q1.

The digital state machine 250 determines when to turn on the BJT power switch Q1 based on the selected PWM mode, PFM mode, DPWM mode or DPFM mode. Also based on the determined Vipk information, the digital state machine 250 can predict the maximum BJT collector current (since $I_{SENSE}$ is limited to Vipk) and determine how much base current is needed in BJT power switch Q1. Together with the Tp, Trst timing information and the determined base current information, digital state machine 250 can turn on the BJT power switch Q1 with dynamic base drive control. After the BJT is turned on and the transformer primary current is built up, $I_{SENSE}$ pin voltage increases because the sense resistor R12

(see FIG. 2) is connected from the BJT Q1 emitter to ground and the emitter is connected to the $I_{SENSE}$ pin. As explained above, BJT base driver 214 turns off BJT power switch once $I_{SENSE}$ pin voltage reaches the threshold voltage Vipk. Thus, digital logic control block also controls the turning off of BJT power switch Q1 through peak current mode switching by setting the threshold voltage Vipk.

Performance Comparison

Figure 4A:
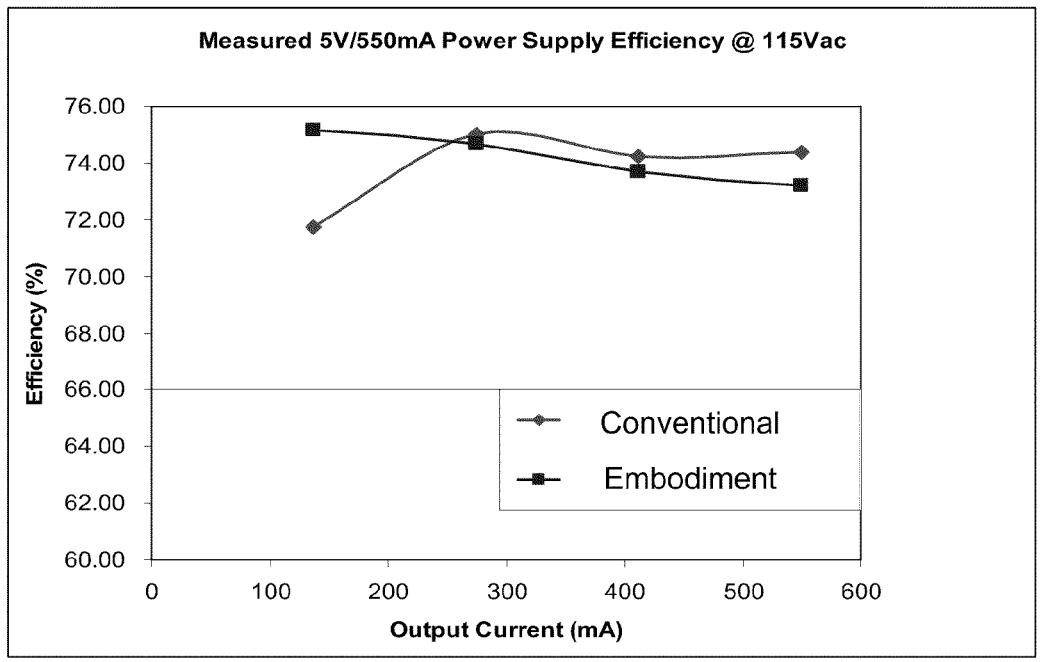
FIG. 4A is a graph illustrating the measured efficiency of the switching power converter according to one embodiment compared against a conventional switching power converter at a line input voltage of 115V.

FIG. 4A is a graph illustrating the measured efficiency of the switching power converter according to one embodiment compared against a conventional switching power converter at an AC input voltage of 115V. The conventional switching power converter operating under PWM mode or PFM mode as illustrated in FIG. 3A. The switching power converter according to one embodiment transitions between modes as illustrated in FIG. 3A by lines A'-B, B-C and C-D. The switching power converter of the embodiment exhibits approximately the same level of efficiency at high load conditions above 250 mA output current. The efficiency of the conventional switching power converter drops significantly at light load conditions below 250 mA output current, whereas the power converter according to the embodiment increases in efficiency as the load drops.

Figure 4B:
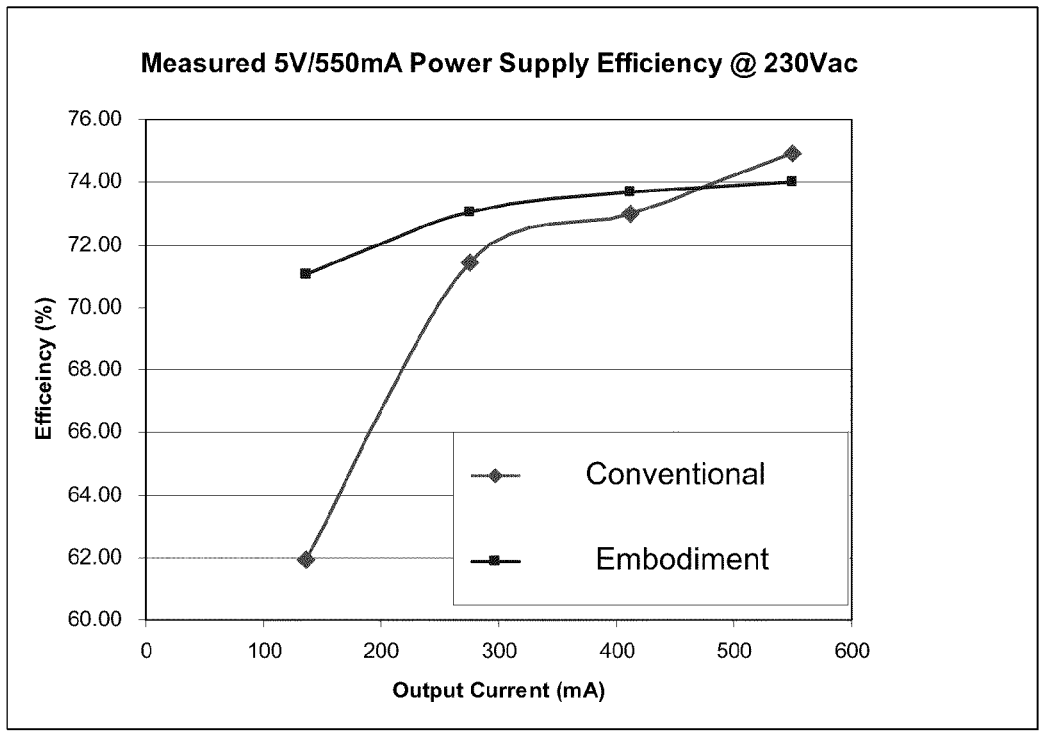
FIG. 4B is a graph illustrating the measured efficiency of the switching power converter according to one embodiment compared against the conventional switching power converter at a line input voltage of 230V.

FIG. 4B is a graph illustrating the measured efficiency of the switching power converter according to one embodiment compared against the conventional switching power converter at 230V AC input. FIG. 4B illustrates similar results as FIG. 4A except that the AC input voltage is set to a higher level of 230V. The power converter according to the embodiment does not exhibit significant drop in efficiency even as the load decreases below 250 mA output current level. In contrast, the conventional power converter experiences a significant drop in its efficiency below 250 mA output current level.

PWM Mode Operation in Light Load Conditions

In one embodiment, the power converter operates in third PWM mode (hereinafter referred to as 'deep-deep PWM' or DDPWM) in very-light-load or no-load conditions to improve dynamic load response. When the load across the output of the power converter is abruptly increased (e.g., by initially connecting the power converter to an external output load while the power converter is in a very-light-load or no-load condition), the output voltage of the power converter may drop below a permissible level and also take an extended amount of time to recover back to the regulated output voltage due to low switching frequency in the light load conditions. In order to enhance dynamic output regulation performance at the very-light-load or no-load conditions, the power converter according to one embodiment switches to operate in DDPWM mode at a predetermined switching frequency and then transitions to DPFM mode or third PFM mode (hereinafter referred to as referred to as 'deep-deep PFM' or DDPFM) as the load across the output of power converter is increased or decreased.

Figure 5A:
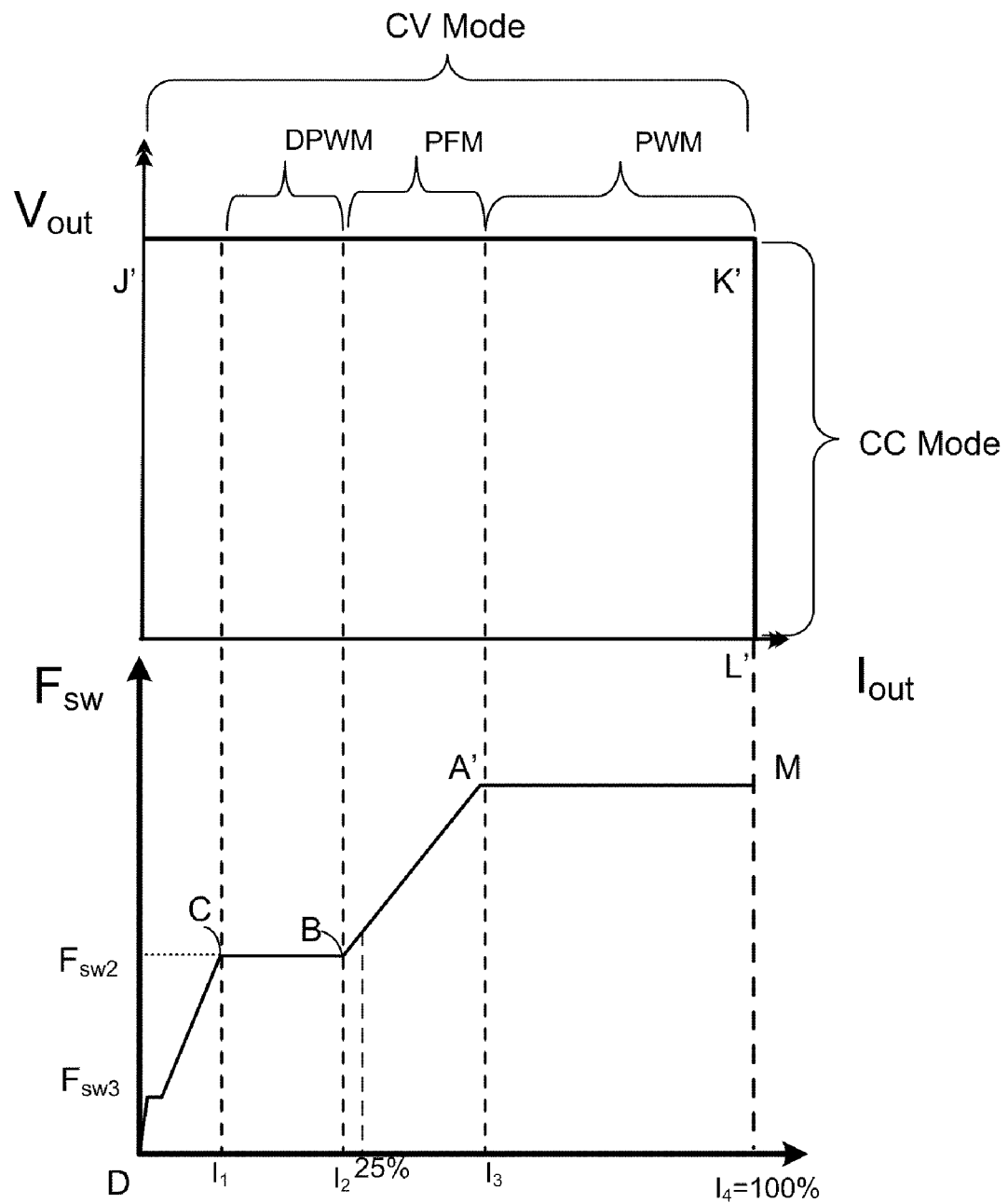
FIG. 5A is a graph illustrating the operation modes of a switching power converter, according to another embodiment.

FIG. 5A is a graph illustrating the operation modes of a switching power converter implementing DDPWM and DDPFM modes, according to one embodiment. The operation of power converter above output current level $I_1$ is essentially the same as the embodiment described above with reference to FIG. 3A, and therefore, the detailed description thereof is omitted herein for the sake of brevity. In this embodiment, the power converter operates in two additional modes (DDPWM mode and DDPFM mode) at light load conditions where the output current Iout is below level $I_1$ instead of operating in a single DPFM mode throughout the light load conditions.

Figure 5B:
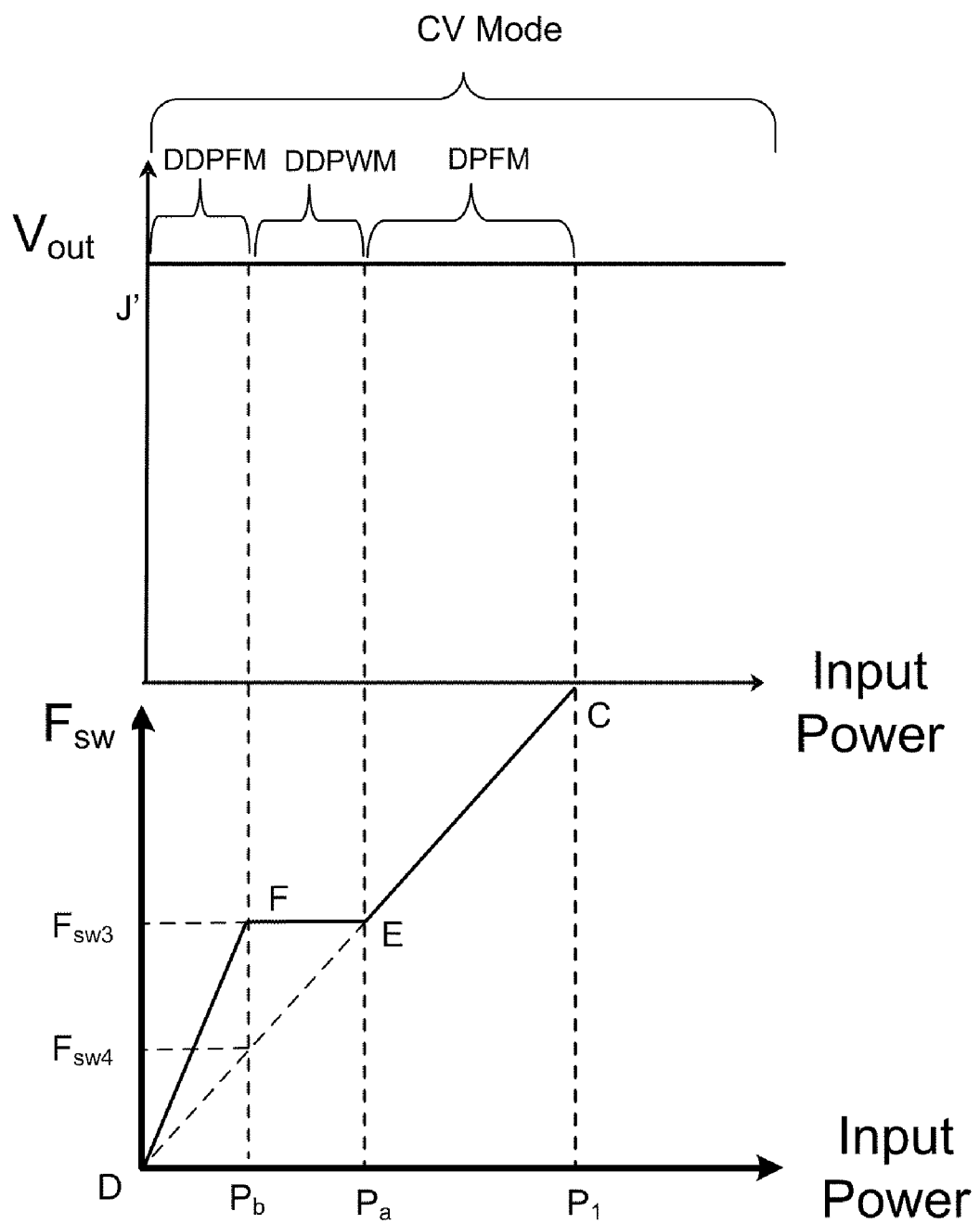
FIG. 5B is a graph illustrating the operation modes of FIG. 5A at light load conditions in more detail, according to one embodiment.

FIG. 5B is a graph illustrating the operation modes of FIG. 5A at light load conditions in more detail, according to another embodiment. In a scenario where the input power of the power converter is gradually decreased below $P_1$ ($P_1$ corresponds to the input power of the power converter when output current of the power converter is $I_1$ as illustrated in FIG. 5A), the power converter operates in DPFM mode represented by line C-E, as in any PFM mode. When the input power of the power converter drops to $P_a$, the power converter transitions and operates in DDPWM mode represented by line E-F, as in any PWM mode.

In one embodiment, the line E-F normally corresponds to the no-load operation during which the input of the power converter is connected to a power source but the output of the power converter is not connected to any load. In no-load conditions, the actual output current from the power converter is zero or close to zero but the input power is not zero due to power consumption by the power converter. $P_a$ represents an input power of the power converter. $P_a$ may be approximately 1% of the maximum input power consumption of the power converter. Note that the horizontal axis of FIG. 5B represents input power of the power converter (unlike FIG. 3A where the horizontal axis represents output current). As the load decreases, the power consumed by the power converter becomes more dominant and can no longer be disregarded. Therefore, in FIG. 5B, the reference points $P_1$, $P_a$ and $P_b$ are indicated as a fraction of the maximum input power of the power converter instead of the maximum output current of the power converter.

In DDPWM mode, the switching frequency of the power converter is maintained at $F_{SW3}$. When the input power drops further (for example, when the controller itself typically implemented as an integrated circuit consumes very low power or the pre-load resistor R14 in FIG. 2A is very large or completely be removed), the input power drops further to $P_b$, the power converter transitions and operates in DDPFM mode represented by line F-D, as in any PFM mode. In one embodiment, $P_b$ represents less that about 0.5% of the maximum input power consumption of the power converter.

In a scenario where the load is gradually increased from a point where the input power is below $P_b$, the power converter operates in DDPFM mode until the input power reaches $P_b$. At this point, the power converter transitions to DDPWM mode. As the load increases, the duty cycle of the power converter is increased in DDPWM mode until the input power reaches $P_a$. After reaching $P_a$, the power converter transitions to DPFM mode and operated in DPFM mode until the load increases and the input power reaches $P_1$.

Operating the power converter in DDPWM mode is advantageous, among other reasons, because the dynamic load response of the power converter at light load conditions can be improved. In the embodiments of FIGS. 5A and 5B, operation of the power converter in DDPWM mode followed by DDPFM mode maintains the switching frequency of the power converter at a relatively high frequency in very-light-load and no-load conditions (where the input power level is below $P_a$) compared to operating the power converter only in a single DPFM mode represented by line C-D. Taking an example when the input power is $P_b$, the switching frequency of the power converter employing DDPWM and DDPFM modes is $F_{SW3}$. The switching frequency $F_{SW3}$ is higher than the switching frequency $F_{SW4}$ corresponding to the input power level $P_b$ of the power converter operating in DPFM mode throughout the light load conditions. The power converter adjusts the ON and OFF states of power switch Q1 and other parameters on a cycle-by-cycle basis. Hence, increasing the switching frequency at light load conditions improves the dynamic response of the power converter at the light load conditions.

In one embodiment, the switching frequency $F_{SW3}$ is determined based on permissible voltage undershoot ΔVout and the maximum output current $I_{init}$ when a load is initially connected to the power converter from the no-load condition. The permissible voltage undershoot ΔVout and the maximum output current $I_{init}$ may be specified, for example, by the manufacturer of an electronic device that received regulated DC voltage from the power converter. The switching frequency $F_{SW3}$ may be determined by the following equation:

$$F_{SW3} = \frac{I_{init}}{C_{out} \cdot \Delta V_{out}} \quad \text{equation (1)}$$

where $C_{out}$ is capacitance of an output filter (in FIG. 2, C10 corresponds to the output filter). Taking an example of coupling a typical portable electronic device such as a mobile phone to the power converter, the capacitance of the output filter C10 is 460 μF, $I_{init}$ is 600 mA and ΔVout is 700 mV. In this case, equation (1) yields $F_{SW3}$ of about 1.8 kHz.

Transitioning the operation of the power converter to DDPFM mode when the input power further drops is advantageous, among other reasons, because the transition can prevent the output voltage from building abnormally high. If the DDPWM persists throughout the entire no-load condition until the input power drops down to zero, the relatively high constant switching frequency $F_{SW3}$ and the minimum switching ON time limit would force the power converter to generate an output voltage higher than desired, for example, when: (i) the power consumption of the controller itself is very low, (ii) the preload R14 (see FIG. 2A) is very large and does not consume the minimum power generated by the DDPWM switching actions or (iii) in transient states due to abrupt removal or disconnection of an output load from the power converter. Therefore, the operation of the power converter is transitioned to DDPFM mode to ensure the safety of the power converter operation by preventing abnormal increase in the output voltage.

Figure 5C:
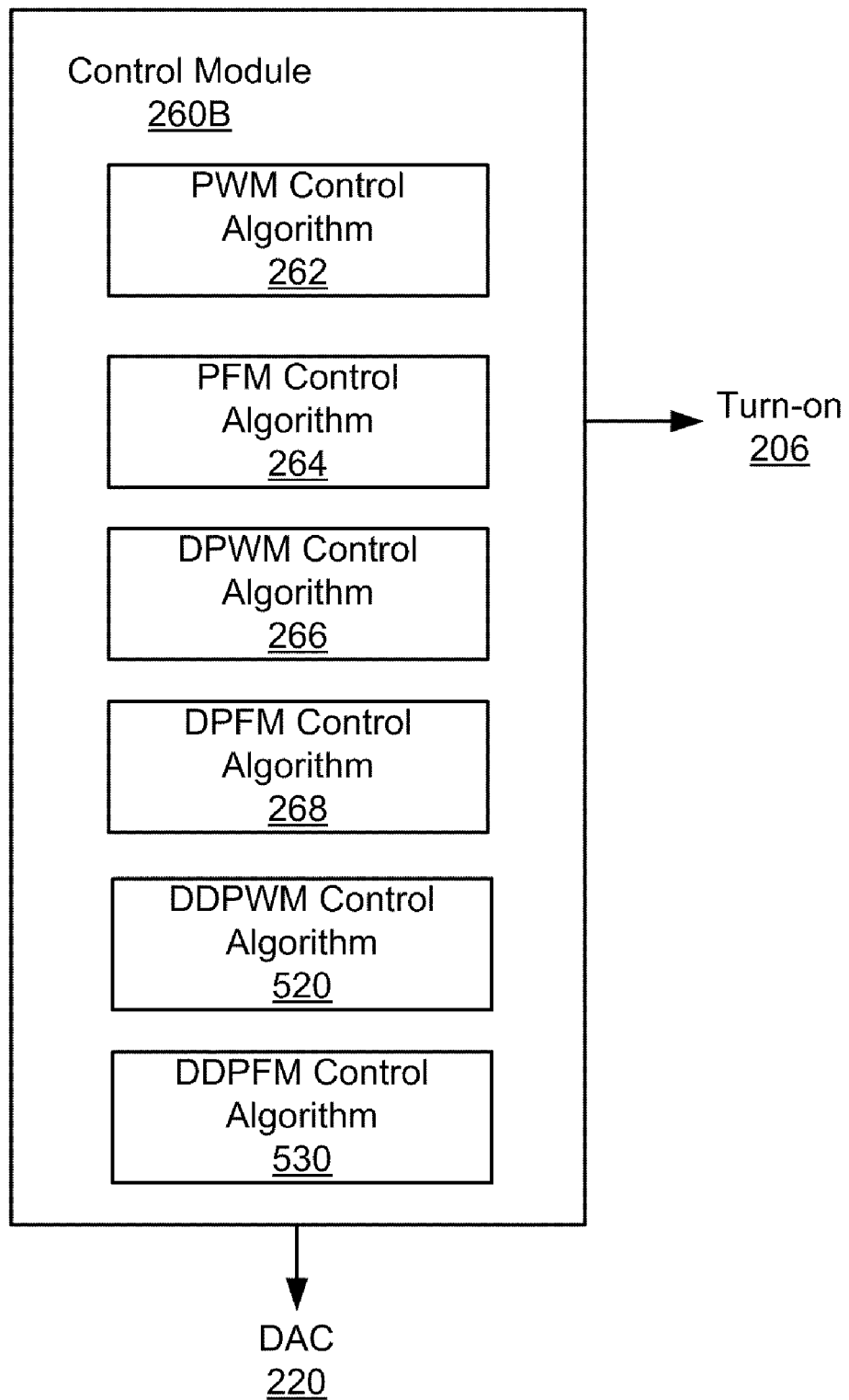
FIG. 5C is a block diagram illustrating an example control module of the controller in the switching power converter implementing the operation modes of FIGS. 5A and 5B, according to one embodiment.

FIG. 5C is a block diagram illustrating an example circuitry of control module 260B, according to one embodiment. The control module 260B replaces the control module 260A in FIG. 3B. The control module 260B further stores a DDPWM control algorithm 520 for implementing DDPWM mode and a DDPFM control algorithm 530 for implementing DDPFM mode in addition to the PWM control algorithm 262, the PFM control algorithm 264, the DPWM control algorithm 266 and the DPFM control algorithm 268. The functions of the PFM control algorithm 264, the DPWM control algorithm 266 and the DPFM control algorithm 268 are described above in detail with reference to FIG. 3B; and detailed description thereof is omitted herein for the sake of brevity. The activated algorithm of the control module 260B generates the digital input signal 219 for the DAC 220 and a turn-on signal 215 for the turn-on logic block 206.

Figure 5D:
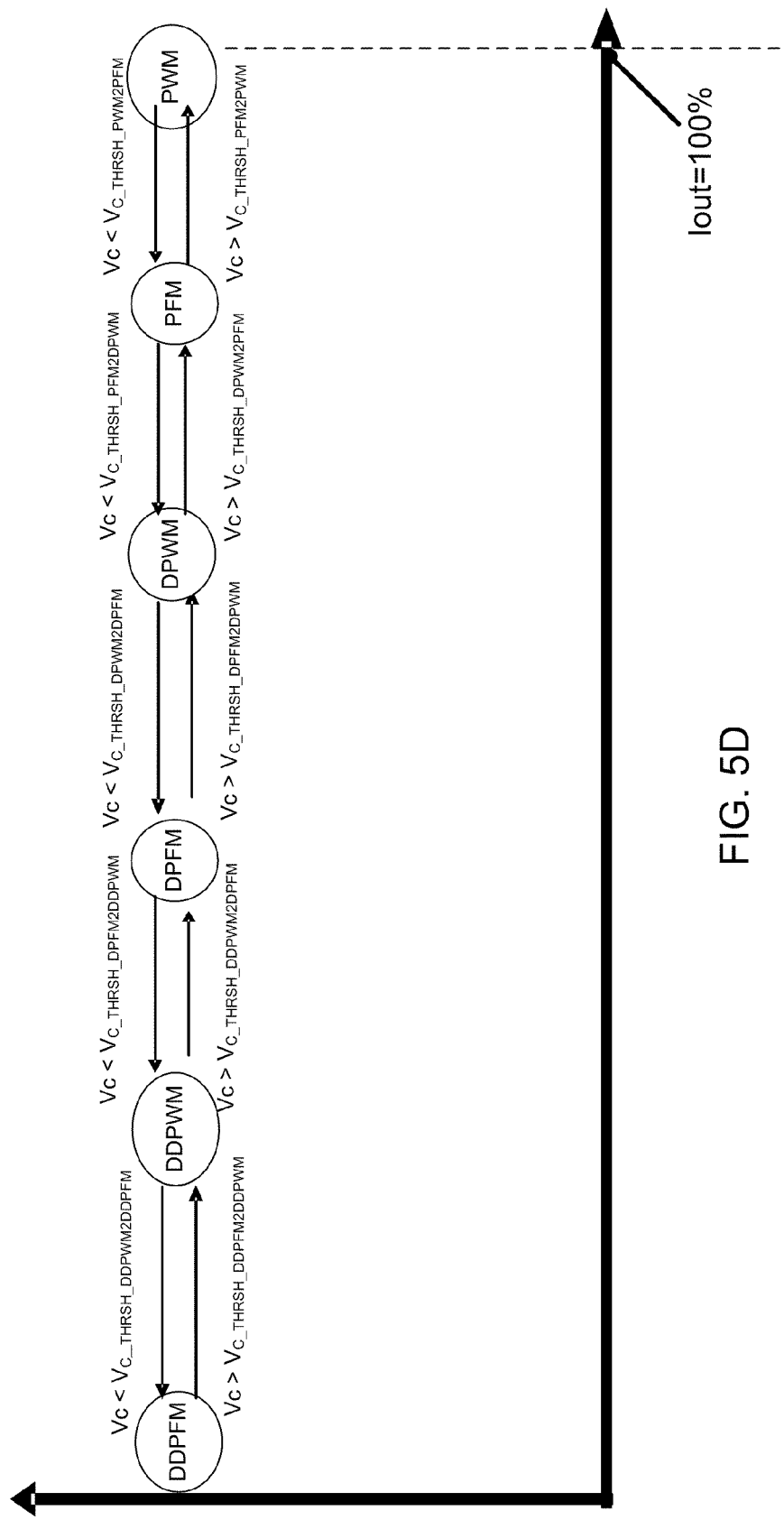
FIG. 5D is a state transition diagram illustrating the operating modes of the switching power converter implementing the operation modes of FIGS. 5A and 5B, according to one embodiment.

FIG. 5D is a state transition diagram illustrating the operating modes of the switching power converter implementing the operation modes of FIGS. 5A and 5B, according to one embodiment. The transition between PWM mode and PFM mode, the transition between PFM mode and DPWM mode, and the transition between DPWM mode and DPFM mode are essentially the same as the embodiment described above in detail with reference to FIG. 3D. Hence, detailed description for these transitions is omitted herein for the sake of brevity. When the control voltage Vc drops to a set value $V_{C\_THRSH\_DPFM2DDPWM}$, the operation mode of the power converter transitions from DPFM mode to DDPWM mode. As the control voltage Vc drops further to a set value $V_{C\_THRSH\_DDPWM2DDPFM}$, the power converter transitions from the DDPWM mode to DDPFM mode. On the other hand, if the control voltage Vc rises above a set value $V_{C\_THRSH\_DDPFM2DDPWM}$, the operation mode of the power converter transitions from DDPFM to DDPWM mode. When the control voltage Vc rises further above a set value $V_{C\_THRSH\_DDPWM2DPFM}$, the power converter transitions from DDPWM mode to DPFM mode.

In one embodiment, $V_{C\_THRSH\_DPFM2DDPWM}$ and $V_{C\_THRSH\_DDPWM2DPFM}$ are set to the values that are generated by the load detector 240 when the input power of the power converter is at level $P_a$ with certain hysteresis. Likewise, $V_{C\_THRSH\_DDPWM2DDPFM}$ and $V_{C\_THRSH\_DDPFM2DDPWM}$ are set to the values that are generated by the load detector 240 when the input power is at level $P_b$, with certain hysteresis.

Upon reading this disclosure, those of skill in the art will appreciate still additional alternative designs for switching power converters. For example, the controller 102 may be implemented as an analog circuit generating the control signal 110 based on analog signal processing. Further, although the controller 102 and its application circuit shown in FIG. 2 are based on the primary-side feedback control, the same principle of this invention is also applicable to alternative designs based on the conventional secondary-side feedback control. Further, a MOSFET (metal-oxide-semiconductor field-effect transistor) switch may be used in place of BJT switch Q1. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the present invention.

What is claimed is:

1. A power converter comprising:
   a switch that electrically couples or decouples a load to or from a power source; and
   a switch controller coupled to the switch for controlling on-times and off-times of the switch, the switch controller including a digital logic generating a pulse signal for controlling on-times and off-times of the switch, the digital logic configured to:
   modulate a width of the pulse signal and maintain a frequency of the pulse signal at a first frequency responsive to the load exceeding a first load level;
   modulate the frequency of the pulse signal and maintain the width of the pulse signal constant responsive to the load decreasing below the first load level but exceeding a second load level; and
   modulate the width of the pulse signal and maintain the frequency of the pulse signal at a second frequency lower than the first frequency responsive to the load decreasing below the second load level but exceeding a third load level.

2. The power converter of claim 1, wherein the digital logic is further configured to:
   modulate the frequency of the pulse signal and maintain the width of the pulse signal constant responsive to the load not exceeding the third load level.

3. The power converter of claim 1, wherein the second frequency is higher than an audible frequency range.

4. The power converter of claim 3, wherein the second frequency is around 20 KHz.

5. The power converter of claim 1, wherein the second load level is below 25% of the maximum load of the power converter and the first load level is above 25% of the maximum load of the power converter.

6. The power converter of claim 1, wherein the digital logic is further configured to:
modulate the frequency of the pulse signal and maintain the width of the pulse signal constant responsive to the load exceeding a fourth load level and not exceeding the third load level; and
modulate the width of the pulse signal and maintain the frequency of the pulse signal at a third frequency responsive to the load exceeding a fifth load level and not exceeding the fourth load level; and
modulate the frequency of the pulse signal and maintain the width of the pulse signal constant responsive to the load below the fifth load level.

7. The power converter of claim 6, wherein the third frequency is determined to maintain undershoot of output voltage of the power converter within a permissible range responsive to initial connection of the load to the power converter from a no-load condition.

8. The power converter of claim 6, wherein the fourth load level is about 1% of a maximum input power consumption of the power converter and the fifth load level is less than around 0.5% of the maximum input power consumption of the power converter.

9. The power converter of claim 1, wherein the digital logic configured to:
transition from modulating the frequency of the pulse signal to modulating the width of the pulse signal responsive to the load increasing above a fourth load level, the fourth load level different from the third load level;
transition from modulating the width of the pulse signal to modulating the frequency of the pulse signal responsive to the load increasing above a fifth load level, the fifth load level different from the second load level; and
transition from modulating the frequency of the pulse signal to modulating the frequency of the pulse signal responsive to the load increasing above a sixth load level, the sixth load level different from the first load level.

10. A switch controller controlling on-times and off-times of a switch that electrically couples or decouples a load to or from a power source in a power converter, the controller comprising:
digital logic generating a pulse signal for controlling on-times and off-times of the switch, the digital logic configured to:
modulate the width of the pulse signal and maintain the frequency of the pulse signal at a first frequency responsive to the load exceeding a first load level;
transition to modulating the frequency of the pulse signal and maintain the width of the pulse signal constant responsive to the load decreasing below the first load level but exceeding a second load level; and
transition to modulating the width of the pulse signal and maintain the frequency of the pulse signal at a second frequency lower than the first frequency responsive to the load decreasing below the second load level but exceeding a third load level.

11. The switch controller of claim 10, wherein the digital logic is further configured to:
modulate the frequency of the pulse signal and maintain the width of the pulse signal constant responsive to the load not exceeding the third load level.

12. The switch controller of claim 10, wherein the second frequency is higher than an audible frequency range.

13. The switch controller of claim 12, wherein the second frequency is around 20 KHz.

14. The switch controller of claim 10, wherein the second load level is below 25% of a maximum load of the power converter and the first load level is above 25% of the maximum load of the power converter.

15. The switch controller of claim 10, wherein the digital logic is further configured to:
modulate the frequency of the pulse signal and maintain the width of the pulse signal constant responsive to the load exceeding a fourth load level and not exceeding the third load level;
modulate the width of the pulse signal and maintain the frequency of the pulse signal at a third frequency responsive to the load exceeding a fifth load level and not exceeding the fourth load level; and
modulate the frequency of the pulse signal and maintain the width of the pulse signal responsive to the load below the fifth load level.

16. The switch controller of claim 15, wherein the third frequency is determined to maintain undershoot of output voltage of the power converter within a permissible range responsive to initial connection of the load to the power converter from a no-load condition.

17. The switch controller of claim 15, wherein the fourth load level is about 1% of a maximum input power consumption of the power converter and fifth load level is less than about 0.5% of the maximum input power consumption of the power converter.

18. The switch controller of claim 10, wherein the digital logic configured to:
transition from modulating the frequency of the pulse signal to modulating of the width of the pulse signal responsive to the load increasing above a fourth load level, the fourth load level different from the third load level;
transition from modulating the width of the pulse signal to modulating the frequency of the pulse signal responsive to the load increasing above a fifth load level, the fifth load level different from the second load level; and
transition from modulating the frequency of the pulse signal to modulating the frequency of the pulse signal responsive to the load increasing above a sixth load level, the sixth load level different from the first load level.

19. A method of controlling on-times and off-times of a switch by a pulse signal that electrically couples or decouples a load to or from a power source in a power converter, the method comprising:
modulating a width of the pulse signal and maintain a frequency of the pulse signal at a first frequency responsive to the load exceeding a first load level;
modulating the frequency of the pulse signal and maintaining the width of the pulse signal constant responsive to the load decreasing below the first load level but exceeding a second load level; and
modulating the width of the pulse signal and maintaining the frequency of the pulse signal at a second frequency lower than the first frequency responsive to the load decreasing below the second load level but exceeding a third load level.

20. The method of claim 19, further comprising:
modulating the frequency of the pulse signal and maintaining the width of the pulse signal constant responsive to the load exceeding a fourth load level and not exceeding the third load level;
modulating the width of the pulse signal and maintaining the frequency of the pulse signal at a third frequency responsive to the load exceeding a fifth load level and not exceeding the fourth load level; and
modulating the frequency of the pulse signal and maintaining the width of the pulse signal constant responsive to the load below the fifth load level.

* * * * *